United States Patent [19]

Reed, Jr.

[11] Patent Number: 6,103,029
[45] Date of Patent: Aug. 15, 2000

[54] TRIAZOLE CROSS-LINKED POLYMERS

[75] Inventor: Russell Reed, Jr., Ridgecrest, Calif.

[73] Assignee: The United States of America as represented by the Secretary of the Navy, Washington, D.C.

[21] Appl. No.: 08/880,710

[22] Filed: Jun. 23, 1997

[51] Int. Cl.$^7$ .......................... C06B 33/12; C08G 63/91; C08G 73/00
[52] U.S. Cl. .................. 149/40; 528/48; 528/55; 528/71; 528/76; 528/361; 528/403; 528/417; 528/420; 528/421; 528/422; 525/403; 525/410; 149/19.4; 149/19.6; 149/19.9; 149/23; 149/38
[58] Field of Search .................................. 528/361, 403, 528/417, 420, 421, 422, 48, 55, 71, 76; 525/403, 410; 149/19.4, 19.6, 19.9, 23, 38, 40

[56] References Cited

U.S. PATENT DOCUMENTS

| | | |
|---|---|---|
| 3,132,976 | 5/1964 | Klager et al. ........................... 149/19.4 |
| 3,245,849 | 4/1966 | Klager et al. ........................... 149/19.4 |
| 3,350,245 | 10/1967 | Dickinson .............................. 149/19.2 |
| 3,645,917 | 2/1972 | Vandenberg . | |

*Primary Examiner*—Samuel A. Acquah
*Attorney, Agent, or Firm*—Earl H. Baugher Jr.; Gregory M. Bokar

[57] ABSTRACT

Polyethers containing pendant azide groups are cured without a catalyst by cyclo-addition with diacetylenes to form triazole cross-linked, energetic binders having improved mechanical properties and stability. The polyethers typically have three hydroxy-terminated chains each of about 5000 to about 50,000 daltons. Ideally, only one azide group per chain reacts by cyclo-addition since the diacetylene is added in a proportion of about one molecule to each two polyether chains. Repeating units of glycidal azide, azidomethylmethyloxetane, bis-azidomethyloxetane/nitratomethylmethyloxetane, and bis-azidomethyloxetane/azidomethylmethyloxetane are believed effective as polyethers when used with the diethynlbenzenes 1,4-bis(ethynl) benzene, 1,4-bis(ethynlcarbonyl)benzene, and 1,3-bis (cyanoethynl)benzene. The polyethers may be further cross-liked at the hydroxyl terminations by urethane bonds.

15 Claims, No Drawings

TRIAZOLE CROSS-LINKED POLYMERS

CROSS REFERENCE TO RELATED APPLICATION

This application is a substitute for U.S. patent application Ser. No. 08/243,034 which was filed May 16, 1994 and which is now abandoned.

BACKGROUND OF THE INVENTION

1. Field of the Invention

The present invention relates to energetic polymers particularly useful in rocket propellant binder compositions and formed from polyethers bearing pendant azide groups cross-linked without a catalyst by a diacetylene.

2. Description of the Prior Art

Composite solid rocket propellants are presently manufactured using a variety of liquid di- and tri-functional polyol prepolymers which can be cross-linked to form elastomeric polyurethane binders which are used to form composite solid rocket fuel grains having superior mechanical properties. The polyurethane binders are widely used in both propellants and plastic bonded explosives and were developed during the 1950's to take advantage of the longchain polyalcohols which were becoming available in a wide molecular weight range. These polyalcohols, when reacted with diisocyanates form stable polyurethane polymers which could be used in large, case-bonded rocket motors. Even today, the most versatile binder systems for compounding composite propellants are derived from the reaction of hydroxyl-terminated polyols with diisocyanate to form a polyurethane network. Representative polymers are disclosed in U.S. Pat. Nos. 3,132,976; 3,245,849; and 3,350,245.

The polyurethane binders in composite propellants have excellent mechanical properties. Furthermore, their shrink free, low-temperature controlled cure leads to good reproducibility and high reliability of the resulting propellants. The resulting propellants typically demonstrate better processing characteristics and better aging characteristics than the previously used epoxy cured carboxylated binders. In addition, the polyurethane binders are known to have acceptable compatibility with metal powders and oxides.

However, there are unresolved drawbacks to these particular polyurethane rocket propellants. For example and for reasons not entirely understood, it is difficult to obtain adequate urethane cross-linking in high-energy propellants which require high levels of nitrato plasticizers. This problem may have something to do with the fact that isocyanates homopolymerize as well as react with un-nitrated hydroxyl groups that may be present within the plasticizers.

Another drawback is that upon aging, an undesirable side reaction between urethane and nitrate ester plasticizer occurs which degrades the mechanical properties of these propellants in which a nitroso derivative is formed which decomposes to rupture the polymer chain while liberating nitrogen gas causing cracking of the propellant grain. This process often limits the service life of nitrate ester containing propellants.

Also, the curing of hydroxyl-terminated prepolymers with diisocyanates, to form the polyurethane binders, requires particular catalysts such as organometallic compounds. Although these catalysts can reduce some of the undesirable side reactions, this reduction of the undesirable side reactions is not complete. It has been found that, above ambient temperatures, the presence of residual catalysts from the urethane cure causes a random reversal of the urethane cure reaction and partial depolymerization in the urethane linkages forming isocyanate and hydroxyl-terminated polyether. Once formed, the isocyanate groups can react with themselves to produce, for example, isocyanurates, compounds having a reduced isocyanate content. This loss of isocyanate prevents the urethane linkages from completely regenerating. Consequentially, the binder gradually loses its elasticity and the mechanical properties become unacceptable.

High energy nitrate ester plasticized polyurethane propellants tend to have low values of tensile stress and modulus. This is particularly a problem with highly plasticized azido and nitrato polyoxetanes. These energetic polymers have sterically hindered hydroxyl groups which are slow to react with isocyanates and may not form a complete polymer network. Nitrocellulose has been added to enhance these properties, but it tends to degrade the elongation and thereby decrease toughness.

Accordingly, it would be a substantial advancement in the art to provide polymers useful as a high-energy solid rocket propellant binder from hydroxyl-terminated prepolymers, particularly those having azide groups, if these polymers are characterized by the advantageous properties of polyurethanes, but do not have the above described drawbacks.

U.S. Pat. No. 3,645,917 discloses in Example 1 a linear polymer made by subjecting an epichlorohydrin-ethylene oxide polymer to sodium azide resulting in a polymer with 15.5% of the repeating units corresponding to those of the glycidyl azide polymer (GAP) discussed below. In Example 2 a similar polymer having only 3.9% of such repeating units is produced and cross linked in Example 7 by p-diethnylbenzene in a proportion of one ethynl group per azide group so that it is apparent that substantially all of the original azide groups are converted to triazole linking groups forming a highly cross linked polymer insoluble in acetone and benzene.

This polymer is inherently deficient as an energetic and elastomeric binder for four reasons. First, the polymer provides little energy because the triazole groups individually provide much less energy than the original azide groups and because, in any event, only a small percentage of the repeating units have even a triazole group. Second, the polymer is not soluble in energetic plasticizers such as butanetrioltrinitrate (BTTN) and energetic fillers, such as cyclotetramethylenetetranitramine (HMX), cannot be added. Third, the highly linked sidechains result in a relatively rigid polymer having little elongation before breaking. And fourth, the substantial number of unreacted chlorines from the epichlohydrin would result in low stability of compositions including this polymer.

BRIEF SUMMARY OF THE INVENTION

An object of the present invention is to provide a high-energy rocket propellant binder formed from azido and azido nitrato polyether prepolymers cross-linked by diacetylenes without a catalyst to produce triazoles, thermally stable moieties essentially non-reactive with propellant ingredients.

A further object of the present invention is to provide a high-energy rocket propellant binder composition having the excellent mechanical properties of polyurethane but having improved compatibility with other propellant ingredients.

A still further object is to aprovide such a high-energy binder cured from azido-hydroxyl-terminated polyether prepolymers and having no tendency to depolymerize from catalyst residue.

An additional object is to provide such a high-energy binder which is soluble in energetic plasticizers, which remains cross-linked in high levels thereof, and which is adapted for such compositions having energetic fillers.

These objects and others, which will be apparent from the following detailed description, examples, and claims, are fulfilled by curing polyethers having repeating units with at least one pendant azide group, the curing being achieved without a catalyst by cyclo-addition with diacetylenes. The polyethers typically have three hydroxyl-terminated chains each of about 5000 to about 50,000 daltons. Preferably, the diacetylene is added in a proportion of about one molecule to each two polyether chains so that, ideally, only one azide group per chain reacts by cyclo-addition. Glycidal azide polymer (GAP), azidomethylmethyloxetane polymer (AMMO), bis-azidomethyloxetane/nitratomethylmethyloxetane polymer (BAMO/NMMO), and bis-azidomethyloxetane/azidomethylmethyloxetane (BAMO/AMMO) are believed effective as such polyethers when used with diacetylenes such as 1,4-bis(ethynl)benzene, 1,4-bis(ethynlcarbonyl)benzene, and 1,3-bis(cyanoethynl)benzene. The polyethers may be further cross-liked at the hydroxyl terminations by urethane bonds formed in any suitable manner.

DETAILED DESCRIPTION OF THE INVENTION

The triazole cross-linked polymers of the present invention, are effective as improved elastomeric binders for energetic compositions which may include nitrate ester plasticizers and energetic, granular fillers. As before stated, these polymers are formed by linking polyether chains having at least one pendant azide group at each repeating unit. The polyethers typically are tri-functional with three such chains which are hydroxyl-terminated and have sufficient repeating units so that each chain has a molecular weight of about 5000 to about 50,000 daltons as determined by low angle laser light scattering (LALLS) or by the nuclear magnetic resonance (NMR) of the terminal $CH_2OH$ bonds of the chains.

The polyether chains are cross-linked at about one of the repeating units of each chain by curing with a cyclo-addition reaction to form a triazole link from one of the pendant azide groups without a catalyst by diacetylenes, preferably, diethynlbenzenes. The diacetylene is provided to the polyether in a proportion of about one molecule of the diacetylene to two of the polyether chains so that, ideally, there is only one cross-link between chains with the result that substantially all the azide groups remain to provide high energy, while the degree of cross-linking is such that the resulting triazole cross-linked polymers of the present invention are soluble in energetic plasticizers to form compositions which may include energetic fillers while having desirable elongation and other mechanical properties. Also, the polymers of the present invention are highly stable since there are no isocyanates or organometallic catalysts involved in their formation.

Although urethane linkages have the above described drawbacks, where these drawbacks are not prohibitive and the resulting mechanical properties are desired, triazole cross-linked polymers of the present invention may also incorporate urethane cross-links formed at the hydroxyl terminations by any suitable isocyanate curative and a polyurethane cure catalyst.

The triazole cross-linked polymers of the present invention are formed from azido-hydroxyl-terminated polyether prepolymers themselves formed by polymerization of monomeric molecules each having the pendant methylazido groups of interest in the present invention. As a result, in these polyether prepolymers substantially every repeating unit has at least one pendant azide group so that, in the polyethers formed from these repeating units, substantially every repeating unit has at least one pendant azide group.

Structures of such repeating units effective in the practice of the present invention are, for glycidyl azide polymer (GAP):

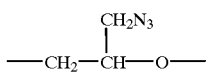

for azidomethylmethyloxetane polymer (AMMO):

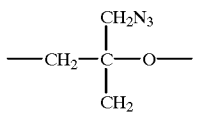

for bis-azidomethyloxetane/nitratomethylmethyloxetane copolymer (BAMO/NMMO):

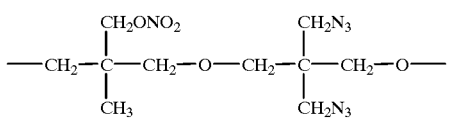

and for bis-azidomethyloxetane/azidomethylmethyloxetane copolymer (BAMMO/AMMO):

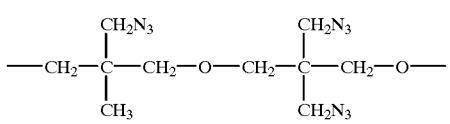

The polyethers have hydroxyl terminated chains represented by:

where R is one of the above repeating units, n is an integer denoting sufficient repeating units to provide a total chain molecular weight of about 5000 to about 50,000 daltons, and X represents the termination of the chain opposite its functional hydroxyl group. For trifunctonal polyethers used in the present invention as in the following Examples, this termination is the polyether structure where the three chains are joined.

These prepolymers are cured in accordance with the present invention without a catalyst by aryl diacetylenes having at least two triple bonded carbon linkages capable of cyclo-addition reaction with azide groups to transform the azide groups into triazole linkages. Structures of such diacetylenes effective in the practice of the present invention are, for 1,4-bis(ethynl)benzene:

for 1,4-bis(ethynlcarbonyl)benzene:

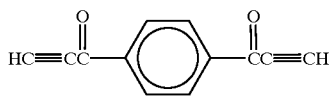

and for 1,3-bis(cyanoethynl)benzene:

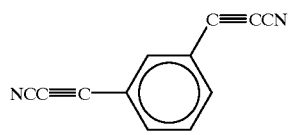

In the reactions of the present invention the acetylene linkages of the above diacetylenes are associated variously with a hydrogen atom, a carbonyl group, and a cyano group which remain inactive during the polymerization reaction so that the general reaction can be represented as:

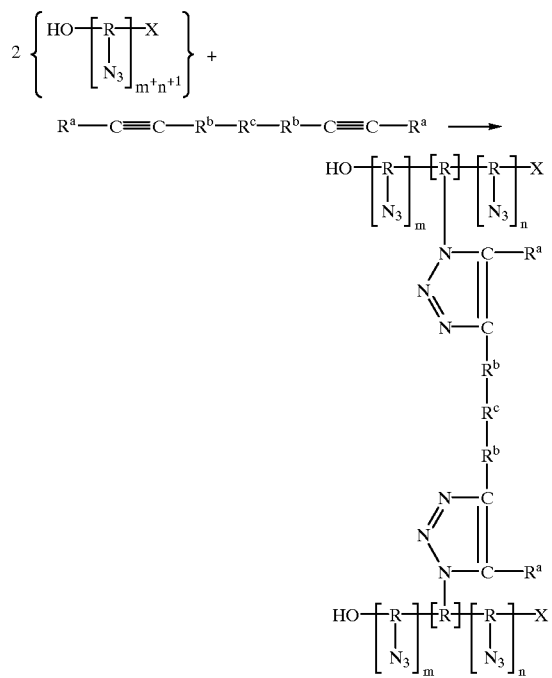

In this representation, for simplicity in exposition only the two side chains cross-linked by the triazole linkages provided by one diacetylene are depicted although, as before stated, the preferred starting azido-hydroxyl-terminated. polyether compounds are characterized by having at least three such chains having sufficient repeating units, indicated by the integers m and n, to provide a chain molecular weight of about 5000 to about 50,000 daltons. In this representation, X and OH are as above-described, and R is the polyether repeating unit which bears at least the one azide represented by $N_3$ or which is cross-linked by a triazole group. $R^a$ and $R^b$ represent the above-identified atoms and groups which remain inactive during the polymerization reaction, $R^a$ representing a terminal hydrogen atom or a cyano group; and $R^b$ representing an intermediate group such as the carbonyl present in 1,4-bis(ethynlcarbonyl)benzene. $R^c$ represents the meta or para connected benzene ring of the aryl diacetylene curative, this ring and connections also being inactive during the polymerization reaction.

Ideally, in the present invention only one azide group per polymeric ether chain reacts by cyclo-addition with each diacetylene triple bond to form a single triazole cross-link between polymeric ether chains. This single linkage is achieved by the diacetylene being added in a proportion of about one molecule of the diacetylene to each two starting azide-hydroxyl-terminated polyether chain; that is, about three moles of the diacetylene to about two moles of the trifunctional azide-hydroxyl-terminated polyether having chains of sufficient length, at least 5000 daltons per chain, to achieve an elastomer.

In one embodiment of the present invention a propellant binder composition including one or more azide-hydroxyl-terminated polyethers is reacted with one or more diacetylene curatives, an isocyanate curative, and a polyurethane cure catalyst so that the diacetylene containing curative reacts with the azide group forming a chemically and thermally stable triazole linkage and the isocyanate curative reacts with the terminal hydroxyl group forming a urethane linkage.

While the azide-hydroxy terminated compounds forming the starting materials of the present invention are preferred to have polyether chains with molecular weights greater than 15,000 daltons, a range of about 5000 to about 50,000 daltons is believed effective. Such compounds have been found to yield compositions having elongations greater than 800%. Propellant compositions embodying the present invention with various diacetylenes and a copolymer of bis-azidomethyloxetane and nitratomethylmethyloxetane (BAMO/NMMO) have been formed with cyclotetramethyl-enetetranitramine (HMX) filler and butanetriol trinitrate (BTTN) plasticizer. Many of the resulting energetic compositions were found to have elongations in the range of about 300% to 800%.

To further illustrate the novel compounds and the process used in their production, there are presented the following examples in which all parts and percentages are, unless otherwise indicated, by weight and in which the diacetylene is added in a proportion by weight of about one molecule to each two functional chains of the trifunctional azide hydroxyl-terminated polyether.

EXAMPLE I

About 12.00 g of cyclotetramethylenetetranitramine (HMX) was added with stirring to a solution composed of 1.94 g of trifunctional BAMO/NMMO (70/30 mole ratio, 6042 eg. wt.) and 6.00 g of butanetrioltrinitrate (BTTN) energetic plasticizer. About 0.058 g of the diacetylene 1,4-bis(ethynlcarbonyl)benzene was added dissolved in 1 ml of methylene chloride. After mixing and deaeration at 3 Torr, the mixture cured at ambient temperature in approximately six hours to yield a tough, rubbery composite. The mechanical properties were tested using a minibone sample of the composite. Tensile stress was 97 psi (uncorrected) and elongation at maximum stress was 315%.

EXAMPLE II

Approximately 0.69 g of trifunctional BAMO/NMMO was added with stirring to a solution of 0.010 g of the diacetylene 1,3-bis(cyanoethynl)benzene dissolved in 1 ml of methylene chloride. After standing for approximately 30 minutes, the residual methylene chloride was evaporated at 5 Torr. The mixture cured in approximately three hours to form a clear, tack free, elastomer with an elongation at maximum stress greater than 800%.

EXAMPLE III

To 2.41 g of trifunctional BAMO/NMMO and 7.50 g of eutectic mixture of the plasticizer 2,2-dinitropropyl acetal/formal (1:1 acetal/formal on a molar basis) there was added 0.113 g of the isocyanate urethane curative diphenyl-methanediisocyanate. After stirring, about 15.0 g of the energetic filler cyclotetramethylenetetranitramine (HMX) was added, and the mixture was stirred again. About 0.025 ml of the polyurethane cure catalyst dibutyltindilaurate was added followed by 0.034 g of the diacetylene 1,3-bis(cyanoethynl)benzene. After heating for approximately 15 hours at 60° C., a rubbery composite propellant was attained with excellent mechanical properties, tensile stress approximately 109 psi and elongation at maximum stress 490%, as determined by testing a minibone sample.

Having described the invention in detail, those skilled in the art will appreciate that modifications may be made to the invention without departing from its spirit. Therefore, it is not intended that the scope of this invention be limited to the specific embodiment described. Rather, it is intended that the scope of the invention be determined by the appended claims and their equivalents.

What is claimed is:

1. An improved elastomeric binder for an energetic composition wherein the binder has cross-linked polyether chains and the improvement comprises:

said chains being formed from a polyether wherein a plurality of repeating units have at least one pendant azide group; and said chains being cross-linked at about one of said repeating units of each chain by a triazole link formed from a pendant azide group of said one of said repeating units by cyclo-addition with a diethynlbenzene.

2. The improved elastomeric binder of claim 1 wherein no catalyst is utilized in forming said triazole link by said cyclo-addition.

3. The improved elastomeric binder of claim 1 wherein substantially every repeating unit of said polyether has at least one pendant azide group.

4. The improved elastomeric binder of claim 3 wherein said chains are cross-linked at about one of said repeating units of each chain by providing the diethynlbenzene to said polyether in a proportion of about one molecule of the diethynlbenzene to two of said polyether chains.

5. The improved elastomeric binder of claim 1 wherein each of said chains has sufficient said repeating units that each of said chains has a total weight of about 5000 to about 50,000 daltons.

6. The improved elastomeric binder of claim 5 wherein said polyether has at least three of said chains.

7. The improved elastomeric binder of claim 6 wherein each of said s chains is hydroxyl terminated.

8. The improved elastomeric binder of claim 1 wherein said polyether is glycidal azide polymer (GAP).

9. The improved elastomeric binder of claim 1 wherein said polyether is azidomethylmethyloxetane polymer (AMMO).

10. The improved elastomeric binder of claim 1 wherein said polyether is bis-azidomethyloxetane/nitratomethylmethyloxetane copolymer (BAMO/NMMO).

11. The improved elastomeric binder of claim 1 wherein said polyether is bis-azidomethyloxetane/azidomethylmethyloxetane copolymer (BAMO/AMMO).

12. The improved elastomeric binder of claim 1 wherein said diethynlbenzene is 1,4-Bis(ethynl)benzene.

13. The improved elastomeric binder of claim 1 wherein said diethynlbenzene is 1,4-Bis(ethynlcarbonyl)benzene.

14. The improved elastomeric binder of claim 1 wherein said diethynlbenzene is 1,3-Bis(cyanoethynl)benzene.

15. The improved elastmomeric of claim 1 wherein:
said chains have hydroxyl terminations, and
the improved elastmomeric further comprises urethane cross-links formed at said hydroxyl terminations by an isocyanate curative and a polyurethane cure catalyst.

* * * * *